United States Patent
Nemori et al.

(10) Patent No.: US 10,033,066 B2
(45) Date of Patent: Jul. 24, 2018

(54) SOLID ELECTROLYTE AND METHOD OF MANUFACTURING SOLID ELECTROLYTE

(71) Applicants: SUZUKI MOTOR CORPORATION, Hamamatsu-shi, Shizuoka (JP); MIE UNIVERSITY, Tsu-shi, Mie (JP)

(72) Inventors: Hiroyoshi Nemori, Hamamatsu (JP); Shigehi Mitsuoka, Hamamatsu (JP); Masaya Nomura, Hamamatsu (JP); Nobuyuki Imanishi, Tsu (JP)

(73) Assignees: SUZUKI MOTOR CORPORATION, Hamamatsu-Shi, Shizuoka (JP); MIE UNIVERSITY, Tsu-Shi, Mie (JP)

( * ) Notice: Subject to any disclaimer, the term of this patent is extended or adjusted under 35 U.S.C. 154(b) by 0 days.

(21) Appl. No.: 15/420,812

(22) Filed: Jan. 31, 2017

(65) Prior Publication Data

US 2017/0250440 A1    Aug. 31, 2017

(30) Foreign Application Priority Data

Feb. 29, 2016 (JP) ................... 2016-037723
Jun. 10, 2016 (JP) ................... 2016-116256

(51) Int. Cl.
*H01M 10/0562*    (2010.01)
*H01M 12/08*    (2006.01)

(52) U.S. Cl.
CPC ....... *H01M 10/0562* (2013.01); *H01M 12/08* (2013.01); *H01M 2220/20* (2013.01); *H01M 2300/0068* (2013.01); *Y02E 60/128* (2013.01)

(58) Field of Classification Search
CPC ............. H01M 10/0562; H01M 12/08; H01M 2220/20; H01M 2300/0068; Y02E 60/128
See application file for complete search history.

(56) References Cited

U.S. PATENT DOCUMENTS

| 4,985,317 A | 1/1991 | Adachi et al. |
| 2014/0057162 A1 | 2/2014 | Schneider et al. |

(Continued)

FOREIGN PATENT DOCUMENTS

DE    102011013018 B3    3/2012

OTHER PUBLICATIONS

Zhang, Peng, et al. "Tape-Cast Water-Stable NASICON-Type High Lithium Ion Conducting Solid Electrolyte Films for Aqueous Lithium-Air Batteries." *Journal of The Electrochemical Society* 162.7 (2015): A1265-A1271.

(Continued)

*Primary Examiner* — Brittany Raymond
(74) *Attorney, Agent, or Firm* — Alston & Bird LLP

(57) ABSTRACT

[Problem to be Solved] An object is to provide a solid electrolyte which is improved in relative density while having favorable lithium-ion conductivity and which can be preferably employed in a lithium-air battery and the like, and a method of manufacturing the same.
[Solution] In a solid electrolyte satisfying formula (I):

$$Li_{1+X}M1_XM2_YTi_{2-X-Y}(PO_4)_3 \qquad (I)$$

(in formula (I), M1 is one or more elements selected from the group consisting of $Al^{3+}$, $Cu^{3+}$, $Co^{3+}$, $Fe^{3+}$, $Ni^{3+}$, $Ga^{3+}$, $Cr^{3+}$, and $Sc^{3+}$, M2 is one or more elements selected from the group consisting of $Si^{4+}$, $Ge^{4+}$, $Sn^{4+}$, $Hf^{4+}$, and $Zr^{4+}$, and X and Y are real numbers satisfying $X+Y \leq 1$),
the solid electrolyte has a NASICON-type crystal structure, and lattice constants of the NASICON-type crystal structure are such that a length along an a-axis is 0.8 nm or more and a length along a c-axis is 2.8 nm or less. Moreover, in a solid electrolyte satisfying formula (II):

$$Li_{1+X-Y}Al_XNb_YTi_{2-X-Y}(PO_4)_3 \qquad (II)$$

(Continued)

(in formula (II), X and Y are real numbers satisfying $X+Y \leq 1$), the solid electrolyte has a NASICON-type crystal structure.

14 Claims, 6 Drawing Sheets

(56) References Cited

U.S. PATENT DOCUMENTS

2014/0295286 A1* 10/2014 Badding ........... H01M 10/0562
429/319
2015/0228970 A1    8/2015 Song et al.

OTHER PUBLICATIONS

"Reelle Zahl [Real Number]" in Wikipedia, Die freie Enzyklopädie. URL: https://de.wikipedia.org/w/index.php?title.Reelle_Zahl&oldid=172731737, (Jan. 2018) with Machine Translation, 14 pages.

Aono, H. et al., *Ionic conductivity and sinterability of lithium titanium phosphate system*, Solid State Ionics, vol. 40-41, Part 1, 1990, pp. 38-42.

Office Action for corresponding German Application No. 102017103266.5 dated Mar. 8, 2018 with English translation, 14 pages.

Pinus, I.Yu. et al., *On cationic mobility in Nasicon phosphates $LiTi_2(PO_4)_3$ and $Li_{0.9}Ti_{1.9}Nb_{0.1}(PO_4)_3$*, Solid State Ionics, Elsevier (2012) 112-116.

* cited by examiner

SOLID ELECTROLYTE AND METHOD OF MANUFACTURING SOLID ELECTROLYTE

CROSS-REFERENCE TO RELATED APPLICATIONS

This application claims priority from Japanese Patent Application No. 2016-037723, filed on Feb. 29, 2016, and Japanese Patent Application No. 2016-116256, filed on Jun. 10, 2016, each of which is incorporated by reference herein in its entirety.

TECHNICAL FIELD

The present invention relates to a solid electrolyte and to a method of manufacturing the same.

BACKGROUND ART

For popularization of electric cars, high expectations are placed on an air battery, which has far higher energy density than a lithium-ion battery. The air battery uses oxygen in the air as a positive electrode active material.

A lithium-air battery is known which uses, as a negative electrode active material, metal lithium, an alloy of which the main component is lithium, or a compound of which the main component is lithium. Depending on the type of electrolyte, lithium-air batteries can be roughly categorized into two types: one using an aqueous electrolyte (solution-based electrolyte, aqueous electrolyte solution) and the other using a non-aqueous electrolyte. The lithium-air battery using the non-aqueous electrolyte is mainly researched and developed since the techniques for lithium-ion batteries except for those for an air electrode can be utilized for the lithium-air battery using the non-aqueous electrolyte.

At the same time, lithium-air batteries using aqueous electrolyte is also being researched and developed, albeit still only a few in number. A lithium-air battery using an aqueous electrolyte has advantages over a lithium-air battery using a non-aqueous electrolyte in that the lithium-air battery using the aqueous electrolyte is not affected by moisture in the air and uses a low-cost and incombustible electrolyte. However, the metal lithium as the negative electrode active material reacts with oxygen and water when coming into direct contact therewith. To avoid this, in a lithium-air battery using an aqueous electrolyte, a solid electrolyte having lithium-ion conductivity is used as a protection layer to protect the metal lithium from the atmosphere and solutions.

A NASICON-type $Li_{1+x}A_xTi_{2-x}(PO_4)_3$ lithium conducting solid electrolyte (hereafter, referred to as NASICON-type solid electrolyte) is known as such a solid electrolyte (Non-patent Document 1 and the like).

The NASICON-type solid electrolyte has low sensitivity to moisture, can be prepared in open air, and is stable while being in contact with a LiCl solution. Moreover, the NASICON-type solid electrolyte has favorable lithium-ion conductivity.

Non-patent Document 1 describes a NASICON-type solid electrolyte having a composition of $Li_{1.4}Al_{0.4}Ge_{0.2}Ti_{1.4}(PO_4)_3$.

However, since many pores are open on the surface of this solid electrolyte, the solid electrolyte has a low relative density of 91.2% at maximum, and a substance may permeate the solid electrolyte through these pores. Accordingly, when the solid electrolyte is used in a portion in contact with moisture such as a separator used to separate, for example, a lithium negative electrode and an aqueous electrolyte solution in a lithium-air battery using the aqueous electrolyte solution, water may permeate the solid electrolyte.

In order to prevent the permeation of water, filling the pores of the solid electrolyte with an epoxy resin or the like is considered. However, in this case, there arises unfavorable problems that it is necessary to employ an additional step of filling the pores of the solid electrolyte, and the filled epoxy resin makes the lithium-ion conductivity lower than that in the state in which the pores are not filled.

Secondarily, Non-patent Document 1 describes the NASICON-type solid electrolyte having the composition of $Li_{1.4}Al_{0.4}Ge_{0.2}Ti_{1.4}(PO_4)_3$ as described above.

In the case in which the solid electrolyte is actually employed to manufacture the air battery and is used for a long period in a moving body such as an automobile, the strength of the solid electrolyte becomes a major issue. A three-point bending strength is one index of strength. However, the three-point bending strength of publicly-known solid electrolytes with high lithium-ion conductivity is insufficient as a solid electrolyte to be used for the aforementioned purpose.

At the same time, solid electrolytes with improved strength are sold and some of them have strength of about 100 $N/mm^2$ which is a practically usable level. However, such solid electrolytes have lithium-ion conductivity of about $1.0 \times 10^{-4}$ S/cm and decrease output from the level sufficient as an air battery.

The aforementioned $Li_{1.4}Al_{0.4}Ge_{0.2}Ti_{1.4}(PO_4)_3$ described in Non-patent Document 1 has the favorable lithium-ion conductivity and is empirically known to improve the strength effectively if an increased amount of Al is added thereto.

However, when an atomic ratio (ratio of number of atoms) of Al in the NASICON-type solid electrolyte having such a composition exceeds 0.4, Al atoms not packed in the crystal structure deposit as impurities, and the atomic ratio of Al cannot be increased. Accordingly, the NASICON-type solid electrolyte has a problem that the strength and the lithium-ion conductivity of the solid electrolyte itself cannot be improved.

PRIOR ART

Non-Patent Document

[Non-patent Document 1] Zhang et al. Journal of The Electrochemical Society 162(7) A1265-A1271(2015) "Tape-Cast Water-Stable NASICON-Type High Lithium Ion Conducting Solid Electrolyte Films for Aqueous Lithium-Air Batteries"

SUMMARY OF INVENTION

Problems to be Solved by the Invention

In view of the circumstances described above, an object of the present invention is to provide a solid electrolyte which is improved in relative density while having favorable lithium-ion conductivity and which can be preferably employed in a lithium-air battery and the like, and a method of manufacturing the same.

Secondarily, in view of the circumstances described above, an object of the present invention is to provide a solid electrolyte which is enabled to contain Al in an atomic ratio of more than 0.4 in a composition to improve the lithium-ion conductivity while improving the strength and which can be preferably employed in a lithium-air battery and the like, and a method of manufacturing the same.

Means for Solving the Problems

As a result of research, the inventors of the present invention have found that the relative density of the solid electrolyte can be improved by controlling the crystal structure of a solid electrolyte. Improving the relative density as described above can reduce the probability of water permeating into the solid electrolyte. The solid electrolyte can be thus applied to a portion coming into contact with water in a good manner. Moreover, when pores on the surface of the solid electrolyte are to be filled by using an epoxy resin or the like, the amount of epoxy resin to be used can be reduced. Accordingly, a decrease of the lithium-ion conductivity can be suppressed.

The present invention is a solid electrolyte satisfying formula (I):

$$\text{Li}_{1+X}\text{M1}_X\text{M2}_Y\text{Ti}_{2-X-Y}(\text{PO}_4)_3 \qquad (I)$$

(in formula (I), M1 is one or more elements selected from the group consisting of $Al^{3+}$, $Cu^{3+}$, $Co^{3+}$, $Fe^{3+}$, $Ni^{3+}$, $Ga^{3+}$, $Cr^{3+}$, and $Sc^{3+}$, M2 is one or more elements selected from the group consisting of $Si^{4+}$, $Ge^{4+}$, $Sn^{4+}$, $Hf^{4+}$, and $Zr^{4+}$, and X and Y are real numbers satisfying X+Y≤1), wherein the solid electrolyte has a NASICON-type crystal structure, and lattice constants of the NASICON-type crystal structure are such that a length along an a-axis is 0.8 nm or more and a length along a c-axis is 2.8 nm or less.

The X preferably satisfies 0.35≤X≤0.50. Moreover, the Y preferably satisfies 0.1≤Y≤0.3. A relative density of the solid electrolyte is preferably 92% or more. Furthermore, a lithium-ion conductivity of the solid electrolyte is preferably $4.0\times10^{-4}$ S/cm or more. Moreover, a three-point bending strength of the solid electrolyte is preferably 70 N/mm² or more.

Another aspect of the present invention is a method of manufacturing the solid electrolyte satisfying formula (I):

$$\text{Li}_{1+X}\text{M1}_X\text{M2}_Y\text{Ti}_{2-X-Y}(\text{PO}_4)_3 \qquad (I)$$

(in formula (I), M1 is one or more elements selected from the group consisting of $Al^{3+}$, $Cu^{3+}$, $Co^{3+}$, $Fe^{3+}$, $Ni^{3+}$, $Ga^{3+}$, $Cr^{3+}$, and $Sc^{3+}$, M2 is one or more elements selected from the group consisting of $Si^{4+}$, $Ge^{4+}$, $Sn^{4+}$, $Hf^{4+}$, and $Zr^{4+}$, and X and Y are real numbers satisfying X+Y≤1), the method comprising the steps of:

mixing a solid powder including a composition forming the solid electrolyte;

forming a compact by pressure-molding the mixed powder; and annealing the compact.

Secondarily, as a result of research, the inventors of the present invention have found that, in a NASICON-type solid electrolyte having a composition of, for example, $\text{Li}_{1.4}\text{Al}_{0.4}\text{Ge}_{0.2}\text{Ti}_{1.4}(\text{PO}_4)_3$, the atomic ratio of Al in the composition can be preferably increased beyond 0.4 by adding Nb instead of Ge.

Specifically, a second solid electrolyte of the present invention is a solid electrolyte satisfying formula (II):

$$\text{Li}_{1+X-Y}\text{Al}_X\text{Nb}_Y\text{Ti}_{2-X-Y}(\text{PO}_4)_3 \qquad (II)$$

(in formula (II), X and Y are real numbers satisfying X+Y≤1), wherein the solid electrolyte has a NASICON-type crystal structure.

In formula (II), the Y preferably satisfies 0.1≤Y≤0.3. Moreover, in formula (II), the X preferably satisfies 0.5≤X≤0.6.

Another aspect of the present invention is a method of manufacturing the second solid electrolyte satisfying formula (II):

$$\text{Li}_{1+X-Y}\text{Al}_X\text{Nb}_Y\text{Ti}_{2-X-Y}(\text{PO}_4)_3 \qquad (II)$$

(in formula (II), X and Y are real numbers satisfying X+Y≤1), the method comprising the steps of:

mixing a solid powder including a composition forming the solid electrolyte;

forming a compact by pressure-molding the mixed powder; and annealing the compact.

Advantageous Effects of the Invention

The present invention provides the solid electrolyte which is improved in relative density while having favorable lithium-ion conductivity and which can be preferably employed in a lithium-air battery and the like, and a method of manufacturing the same.

The present invention secondarily provides the solid electrolyte which is enabled to contain Al in an atomic ratio of more than 0.4 in a composition to improve the lithium-ion conductivity while improving the strength and which can be preferably employed in a lithium-air battery and the like, and the method of manufacturing the same.

MODES FOR CARRYING OUT THE INVENTION

A preferable embodiment of a solid electrolyte in the present invention and a method of manufacturing the same are described below in further detail.

A first solid electrolyte in the present invention is a solid electrolyte satisfying the following formula (I):

$$Li_{1+X}M1_XM2_YTi_{2-X-Y}(PO_4)_3 \quad (I).$$

M1 in the formula (I) is a metal element and is one or more metal elements selected from the group consisting of $Al^{3+}$, $Cu^{3+}$, $Co^{3+}$, $Fe^{3+}$, $Ni^{3+}$, $Ga^{3+}$, $Cr^{3+}$, and $Sc^{3+}$. The valences noted herein are each a valance of the metal element M1 when the element forms the NASICON-type solid electrolyte to be obtained. Among these elements, $Al^{3+}$ is particularly preferable.

Meanwhile, M2 is a metal element and is one or more elements selected from the group consisting of $Si^{4+}$, $Ge^{4+}$, $Sn^{4+}$, $Hf^{4+}$, and $Zr^{4+}$. The valences noted herein are each a valance of the metal element M2 when the element forms a NASICON solid electrolyte to be obtained. Among these elements, $Ge^{4+}$ is particularly preferable.

X and Y in the formula (I) are real numbers satisfying X+Y≤1. Satisfying X+Y≤1 can improve the strength and lithium-ion conductivity of the solid electrolyte. Moreover, 0<Y<X is preferable. Including the metal element (M2) having a valance of 4 can increase carrier ions in the solid electrolyte and improve the lithium-ion conductivity. Furthermore, satisfying Y<X can achieve appropriate setting of crystal lattice constants of the solid electrolyte and, as a result, improve the relative density of the solid electrolyte.

Note that X (atomic ratio of the M1 metal element in the solid electrolyte) preferably satisfies 0.35≤X≤0.50. This is preferable because it is possible to obtain desired lengths along the a-axis and the c-axis, reduce the crystal grain-boundary resistance, and obtain high lithium-ion conductivity. Moreover, it is possible to improve the three-point bending strength. Meanwhile, Y (atomic ratio of the M2 metal element in the solid electrolyte) preferably satisfies 0.1≤Y≤0.3. This is preferable because it is possible to reduce the lattice constant along the c-axis and resultantly improve the relative density of the solid electrolyte.

Figure 1:
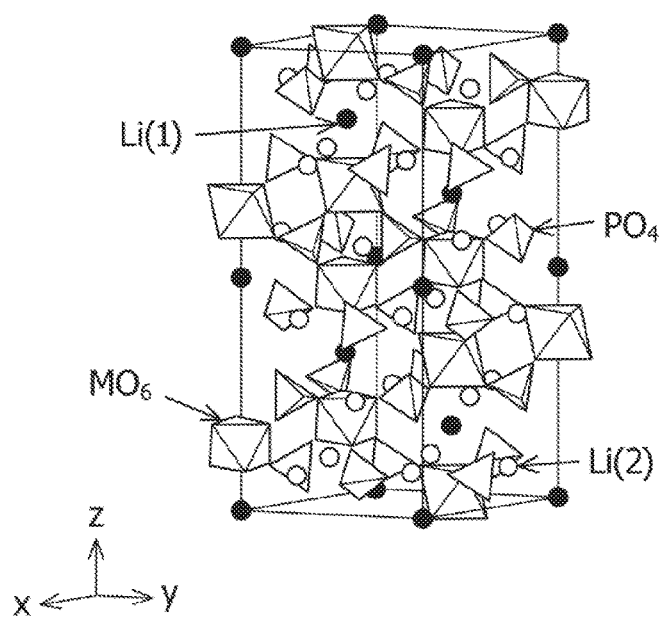
FIG. 1 is a schematic view explaining a NASICON-type crystal structure.

The first solid electrolyte of the present invention has a NASICON-type crystal structure. In further detail, the solid electrolyte of the present invention has a rhombohedral (hexagonal) structure expressed by a space group R–3c. This crystal structure is illustrated in FIG. 1. The crystal structure of FIG. 1 is illustrated by being simplified to $LiM_2(PO_4)_3$. Note that such basic concepts of the crystal structure are the same also for a second solid electrolyte.

Li(1) in FIG. 1 indicates fixed Li irrelevant to ionic conduction, and Li(2) is mobile Li relevant to the ion conduction.

Note that "R" in R–3c expressing the space group indicates the rhombohedral structure. "–3" indicates a symmetry operation of performing rotary inversion (attach – to x, y, and z) by 120 degrees. c indicates c/2 glide reflection (shifting) in the c-axis direction.

In the drawings, the length along the a-axis is denoted by a (x-axis and y-axis directions in the drawing) and the length along the c-axis is denoted by c (z-axis direction in the drawing).

In the first solid electrolyte of the present invention, the lattice constants of the NASICON-type crystal structure are such that the length along the a-axis is 0.8 nm or more and the length along the c-axis is 2.8 nm or less.

The length along the c-axis is 2.8 nm or less as described above, is preferably 2.5 nm or less, and is more preferably 2.2 nm or less. The inventors of the present invention have found that the relative density can be improved by setting the lattice constant within such a range.

Note that the lower limit of the length along the c-axis is determined as a range within which the NASICON-type crystal structure can be maintained, and varies depending on the atomic composition to be employed.

The length along the a-axis is 0.8 nm or more, is preferably 0.82 nm or more, and is more preferably 0.85 nm or more. The inventors of the present invention have found that the relative density can be improved by setting the lattice constant within such a range. Note that the upper limit of the length along the a-axis is determined as a range within which the NASICON-type crystal structure can be maintained, and varies depending on the atomic composition to be employed.

The relative density of the first solid electrolyte of the present invention is preferably 92% or more and is more preferably 95% or more.

When the relative density is within such a range, it is possible to reduce the possibility of water permeating the solid electrolyte and also reduce the amount of an epoxy resin used in the case in which, for example, pores on the surface of the solid electrolyte are filled with the epoxy resin.

Here, the relative density refers to a ratio between the density calculated based on the lattice constants of the solid electrolyte which is a sample and the density based on the volume and mass of the solid electrolyte. The closer to 100% the ratio, the fewer pores in the solid electrolyte.

Furthermore, the lithium-ion conductivity of the first solid electrolyte of the present invention is preferably $4.0 \times 10^{-4}$ S/cm or more and is more preferably $6.0 \times 10^{-4}$ S/cm or more.

When the lithium-ion conductivity is within such a range, for example, the performance of a separator of a battery and the like can be improved in the case in which the solid electrolyte is applied to the separator of the battery and the like.

Moreover, the three-point bending strength of the first solid electrolyte of the present invention is 70 $N/mm^2$ or more, is preferably 80 $N/mm^2$ or more, and is more preferably 85 $N/mm^2$ or more.

Generally, the solid electrolyte is a ceramic material and tends to break when stress is applied thereto.

However, the solid electrolyte having such three-point bending strength can be improved in durability.

The first solid electrolyte of the present invention can be manufactured by performing a step of mixing a solid powder including a composition to form the solid electrolyte described above, a step of pressure molding the mixed powder to form compacts, and a step of annealing the obtained compacts. In other words, the method of manufacturing the first solid electrolyte of the present invention includes at least the steps described above.

Specifically, for example, chemical reagent grade $Li_2CO_3$, $TiO_2$, $GeO_2$, $Al_2O_3$, and $NH_4H_2PO_4$ of amounts corresponding to a NASICON-type $Li_{1+X}Al_XGe_YTi_{2-X-Y}(PO_4)_3$ lithium-ion conducting solid electrolyte are subjected to ball milling with zirconia balls in a zirconia container to obtain the mixed powder.

Next, the mixed powder is pressure-molded into pellets and calcination is performed at a relatively low temperature (500 to 800° C., for example, 600° C.).

Then, the calcinated pellets are reground and subjected to ball milling again.

The obtained powder is pressure-molded into pellets under hydrostatic pressure (generation of compacts).

Thereafter, the pellets are further sintered at 900 to 1200° C. (annealing). Setting the temperature of the annealing to 900° C. or higher can reduce generation of impurities in the manufacturing steps and thereby improve the relative density of the solid electrolyte. At the same time, setting the temperature of annealing to 1200° C. or lower can reduce evaporation of lithium compounds and thereby improve the relative density of the solid electrolyte.

Note that the calcination at a relatively low temperature can be omitted.

Meanwhile, the second solid electrolyte of the present invention is a solid electrolyte satisfying the following formula (II):

$$Li_{1+X-Y}Al_XNb_YTi_{2-X-Y}(PO_4)_3 \quad (II).$$

X and Y in the formula are real numbers satisfying $X+Y \leq 1$.

The solid electrolyte has a NASICON-type crystal structure.

In the formula (II), the Y preferably satisfies $0.1 \leq Y \leq 0.3$. Setting the Y within this range allows the atomic ratio X of Al to be increased beyond 0.4.

Specifically, setting the atomic ratio Y of Nb in the formula (II) within the range of $0.1 \leq Y \leq 0.3$ allows the atomic ratio X of Al in the formula (II) to be set within a range of $0.5 \leq X \leq 0.6$.

Moreover, in the formula (II), the X preferably satisfies $0.5 \leq X \leq 0.6$. Setting the X within this range promotes sintering and improves the strength of the solid electrolyte. Moreover, setting the X within this range improves the relative density of the solid electrolyte and improves a water sealing property.

The solid electrolyte with the increased atomic ratio of Al as described above can have strength of 100 N/mm² or more as explained in an example described later and also have high lithium-ion conductivity of $5.0 \times 10^{-4}$ S/cm or more.

The reason such effects are obtained are assumed to be as follows: Ge which is an element having a valance of 4 is replaced by Nb having a greater valance of 5, and this increases the solubility limit of Al having a small valance of 3, thereby allowing an increase of the amount of Al in the structure. As a result, it is assumed that the ratio of reaction intermediates including Al having a relatively low melting point is increased in the sintering and the sintering is promoted, thereby leading to the improvements in strength and lithium-ion conductivity. In the second solid electrolyte of the present invention, the sintering is actually promoted and the density is actually increased.

The solid electrolyte of the present invention can be manufactured by performing a step of mixing a solid powder including a composition to form the solid electrolyte described above, a step of pressure molding the mixed powder to form compacts, and a step of annealing the obtained compacts. In other words, the method of manufacturing the second solid electrolyte of the present invention includes at least the steps described above.

Specifically, for example, chemical reagent grade $Li_2CO_3$, $TiO_2$, $Nb_2O_5$, $Al_2O_3$, and $NH_4H_2PO_4$ of amounts corresponding to a NASICON-type $Li_{1+X-Y}Al_XNb_YTi_{2-X-Y}(PO_4)_3$ lithium-ion conducting solid electrolyte are subjected to ball milling with zirconia balls in a zirconia container to obtain the mixed powder.

Next, the mixed powder is pressure-molded into pellets and calcination is performed at a relatively low temperature (500 to 800° C., for example, 600° C.).

Then, the calcinated pellets are reground and subjected to ball milling again.

The obtained powder is pressure-molded into pellets under hydrostatic pressure (generation of compacts).

Thereafter, the compacts are further sintered at 900 to 1200° C. (annealing). Setting the temperature of the annealing to 900° C. or higher can reduce generation of impurities in the manufacturing steps and thereby improve the relative density of the solid electrolyte.

Meanwhile, setting temperature of the annealing to 1200° C. or lower can reduce evaporation of lithium compounds and thereby improve the relative density of the solid electrolyte. Note that the sintering can be sufficiently promoted preferably at a temperature from 900 to 1000° C.

Note that the calcination at a relatively low temperature can be omitted.

EXAMPLE

An example of the first solid electrolyte of the present invention is described below. The present invention is not limited by the following example.

Example (First Solid Electrolyte)

Preparation of NASICON-type $Li_{1+X}Al_XGe_YTi_{2-X-Y}$ $(PO_4)_3$ lithium-ion Conducting Solid Electrolyte

A NASICON-type $Li_{1+X}Al_XGe_YTi_{2-X-Y}(PO_4)_3$ lithium-ion conducting solid electrolyte was prepared by conventionally-known solid-phase reaction. The preparation was performed within ranges of X=0.30 to 0.55 and Y=0.1 to 0.3.

Chemical reagent grade $Li_2CO_3$, $TiO_2$, $GeO_2$, $Al_2O_3$, and $NH_4H_2PO_4$ of the corresponding amounts were subjected to ball milling with zirconia balls in a zirconia container at 400 rpm for two hours by using high energy mechanical milling (HEMM) by a planetary micro mill (Fritsch Pulverisette 7) to obtain a mixed powder.

Next, the mixed powder was pressure-molded into pellets at 150 MPa and subjected to calcination at 600° C. for four hours.

The calcinated pellets were reground and subjected to ball milling again by using the HEMM.

The obtained powder was pressure-molded into pellets at 150 MPa under hydrostatic pressure.

Thereafter, the pellets were sintered at various temperatures (850 to 1000° C.) for seven hours.

Analysis of Test Results

Figure 2:
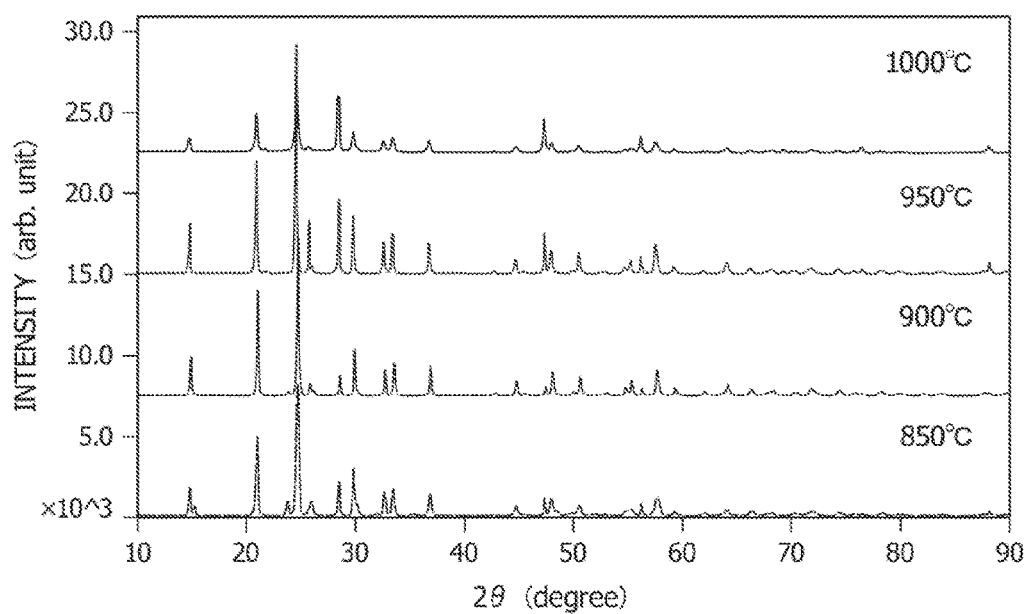
FIG. 2 is a graph depicting XRD patterns of $\text{Li}_{1.5}\text{Al}_{0.5}\text{Ge}_{0.2}\text{Ti}_{1.3}(\text{PO}_4)_3$ samples (corresponding to the case in which X=0.5 and Y=0.2).

FIG. 2 depicts XRD patterns of $Li_{1.5}Al_{0.5}Ge_{0.2}Ti_{1.3}(PO_4)_3$ samples (corresponding to the case in which Y=0.2) sintered at various temperatures for seven hours, by using a silicon internal standard for measuring the lattice constants. An impurity phase of $AlPO_4$ is observed in the sample sintered at 850° C. The reaction was not completed at a low sintering temperature of about 850° C. All diffraction lines of the samples sintered at 900, 950, and 1000° C. were able to be indexed as NASICON-type structures. In other words, the samples sintered at 900, 950, and 1000° C. were able to be determined to have NASICON-type structures.

Figure 3:
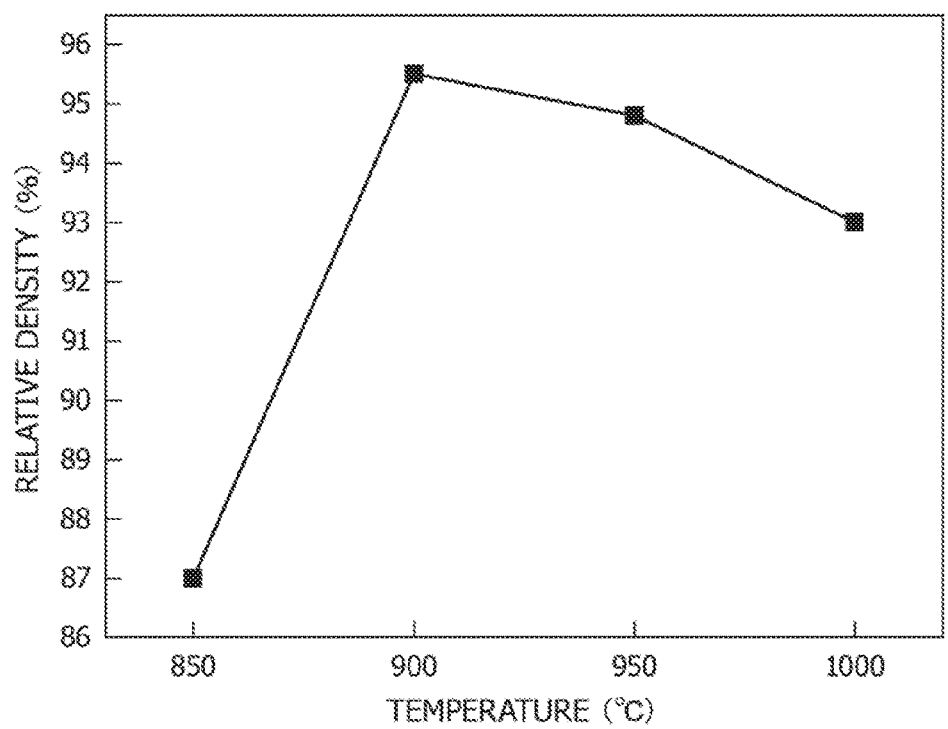
FIG. 3 is a graph depicting the relative densities of $\text{Li}_{1.5}\text{Al}_{0.5}\text{Ge}_{0.2}\text{Ti}_{1.3}(\text{PO}_4)_3$ pellets (corresponding to the case in which X=0.5 and Y=0.2) sintered at various temperatures.

FIG. 3 depicts the relative densities of the $Li_{1.5}Al_{0.5}Ge_{0.2}Ti_{1.3}(PO_4)_3$ pellets (corresponding to X=0.5, Y=0.2) sintered at various temperatures. The sample sintered at 850° C. and having the impurity phase has a low relative density of 87%. The highest relative density of 95.5% is observed in the sample sintered at 900° C. and the relative density decreases as the sintering temperature becomes higher. The decrease of the relative density is considered due to evaporation of lithium compounds at these higher temperatures.

Regarding the relative density, the relative density of each of the sintered samples was estimated from a ratio between the density calculated from the lattice constants and the density calculated from the volume and mass of the sintered main body.

From the results described above, it is understood that a temperature from 900 to 1200° C. is preferable as the sintering temperature, and a temperature from 900 to 1000° C. is more preferable.

The lithium-ion conductivity, relative density, and three-point bending strength of a $Li_{1+X}Al_XGe_{0.2}Ti_{1.8-X}(PO_4)_3$ system (corresponding to Y=0.2) sintered at 900° C. for seven hours were each tested as a function of X.

Figure 4:
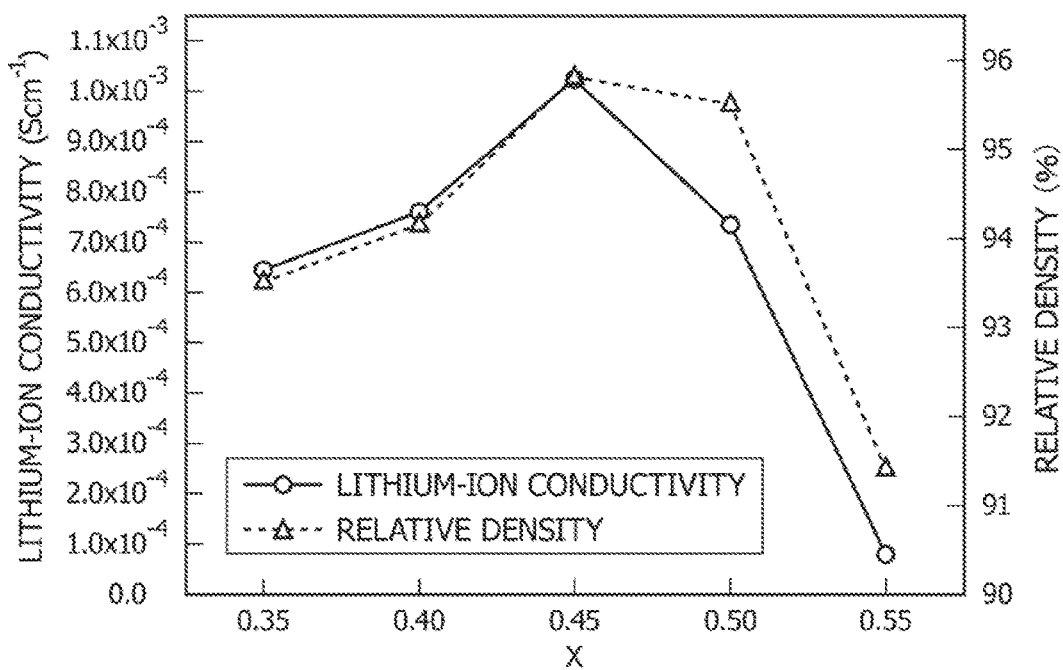
FIG. 4 is a graph depicting the lithium-ion conductivity and relative density of $\text{Li}_{1+X}\text{Al}_X\text{Ge}_{0.2}\text{Ti}_{1.8-X}(\text{PO}_4)_3$ measured at 25° C. as functions of X.

FIG. 4 depicts the lithium-ion conductivity and relative density of $Li_{1+X}Al_XGe_{0.2}Ti_{1.8-X}(PO_4)_3$ measured at 25° C. as the functions of X. The highest lithium-ion conductivity of $1.0\times10^{-3}$ S/cm and the highest relative density of 95.8% at 25° C. are observed in $Li_{1.45}Al_{0.45}Ge_{0.2}T_{1.35}(PO_4)_3$.

Regarding the lithium-ion conductivity, the lithium-ion conductivity of each of the sintered pellets (diameter of about 12 mm and thickness of 1 mm) having electrodes sputtered with gold was measured at bias voltage of 10 mV within a frequency range of 0.1 Hz to 1 MHz, by using an impedance phase analyzer (Solartron 1260).

Regarding the relative density, the relative density of each sintered sample was estimated from a ratio between the density calculated from the lattice constants and the density calculated from the volume and mass of the sintered main body.

Figure 5:
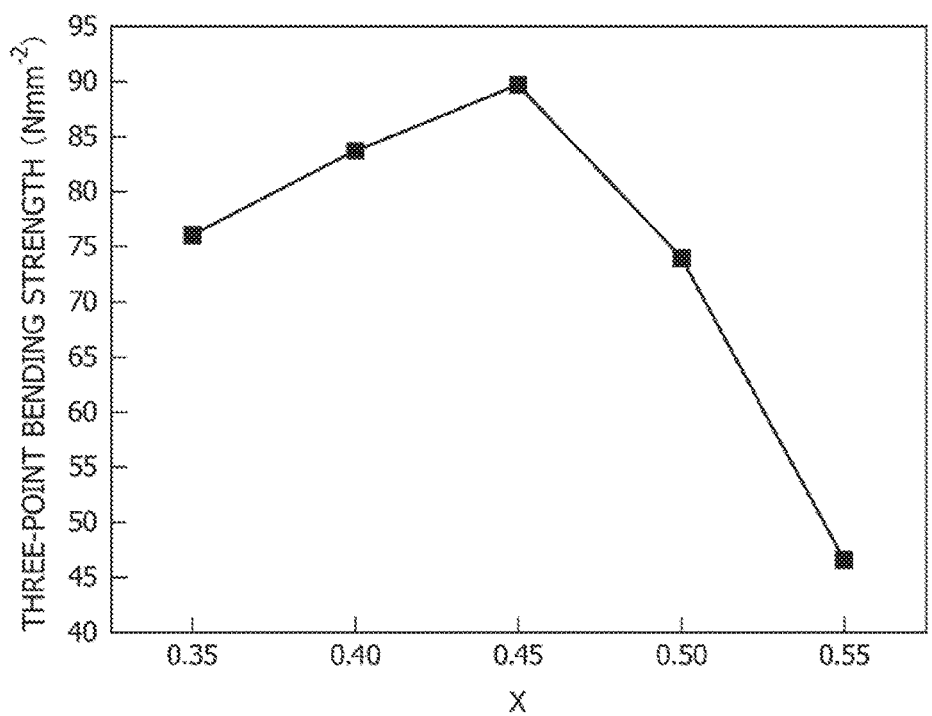
FIG. 5 is a graph depicting the X dependence of three-point bending strength with respect to the Al content of $\text{Li}_{1+X}\text{Al}_X\text{Ge}_{0.2}\text{Ti}_{1.8-X}(\text{PO}_4)_3$ (corresponding to Y=0.2) sintered at 900° C. for seven hours.

FIG. 5 depicts the X dependence of the three-point bending strength with respect to the Al content of $Li_{1+X}Al_XGe_{0.2}Ti_{1.8-X}(PO_4)_3$ (corresponding to Y=0.2) sintered at 900° C. for seven hours. The highest bending strength of 90 N/mm² is observed in $Li_{1.45}Al_{0.45}Ge_{0.2}Ti_{1.35}(PO_4)_3$ having the relative density of 95.8%. The bending strength is higher than 65 N/mm² which the bending strength of $Li_{1.4}Al_{0.4}Ge_{0.2}Ti_{1.4}(PO_4)_3$ prepared by tape casting using a powder prepared in the sol-gel process (Zhang et. al., 2015).

Note that the three-point bending strength of each sintered pellet (thickness of about 0.24 mm and width of about 15 mm) was measured at room temperature by using a material tester (Shimadzu EZ-SX 500N).

It is understood from FIGS. 4 and 5 that the preferable range of X is 0.35 to 0.50.

Figure 6:
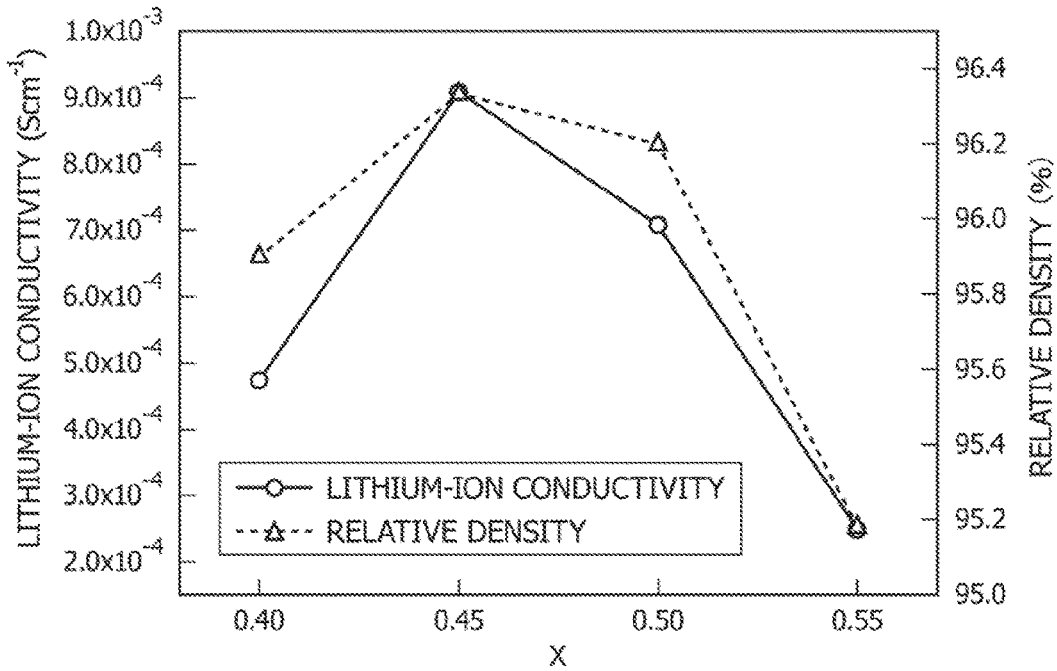
FIG. 6 is a graph depicting the lithium-ion conductivity and relative density of $\text{Li}_{1+X}\text{Al}_X\text{Ge}_{0.3}\text{Ti}_{1.7-X}(\text{PO}_4)_3$ (corresponding to Y=0.3) as functions of X.

FIG. 6 depicts the lithium-ion conductivity and relative density of $Li_{1+X}Al_XGe_{0.3}Ti_{1.7-X}(PO_4)_3$ (corresponding to Y=0.3) as the functions of X. The greatest relative density of 96.3% is observed in $Li_{1.45}Al_{0.45}Ge_{0.3}Ti_{1.25}(PO_4)_3$. It is also understood from FIG. 6 that favorable lithium-ion conductivity and relative density are obtained when X is 0.4 to 0.50.

Regarding the lithium-ion conductivity, the lithium-ion conductivity of each of sintered pellets (diameter of about 12 mm and thickness of 1 mm) having electrodes sputtered with gold was measured at bias voltage of 10 mV within a frequency range of 0.1 Hz to 1 MHz, by using an impedance phase analyzer (Solartron 1260).

Regarding the relative density, the relative density of each sintered sample was estimated from a ratio between the density calculated from the lattice constants and the density calculated from the volume and mass of the sintered main body.

Figure 7:
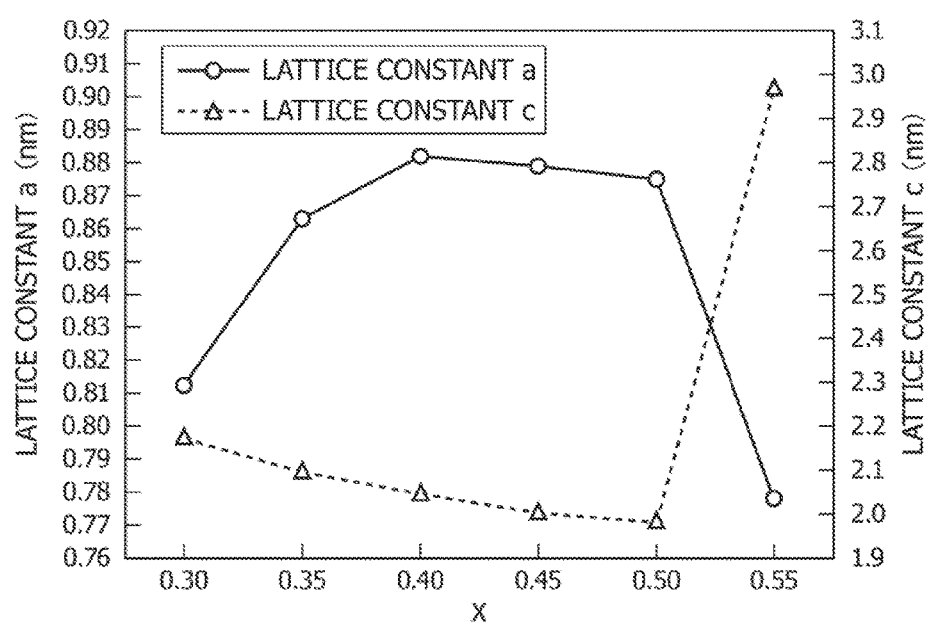
FIG. 7 is a graph depicting variation of lattice parameters depending on X of $\text{Li}_{1+X}\text{Al}_X\text{Ge}_{0.2}\text{Ti}_{1.8-X}(\text{PO}_4)_3$.

FIG. 7 depicts variation of the lattice parameters depending on X of $Li_{1+X}Al_XGe_{0.2}Ti_{1.8-X}(PO_4)_3$. Note that the lattice parameters were able to be determined based on the XRD patterns illustrated in FIG. 1. Specifically, the crystal structures of the sintered samples were analyzed by X-ray diffraction (XRD) analysis at a scanning step speed of 0.02° $s^{-1}$ within a 2θ range of 10° to 90° by using Rigaku RINT2500 diffractometer with Cu Kα radiation.

The lattice parameters corresponding to the range of X understood in advance as the preferable range are understood to be the lattice constants of the NASICON-type crystal structure which are such that the length along the a-axis is 0.8 nm or more and the length along the c-axis is 2.8 nm or less.

An example of the second solid electrolyte of the present invention is described below. The present invention is not limited by the following example.

Example (Second Solid Electrolyte)

Preparation of NASICON-type $Li_{1+X-1}Al_XNb_YTi_{2-X-Y}(PO_4)_3$ lithium-ion Conducting Solid Electrolyte A NASICON-type $Li_{1+X-Y}Al_XNb_YTi_{2-X-Y}(PO_4)_3$ lithium-ion conducting solid electrolyte was prepared by conventionally-known solid-phase reaction. The preparation was performed within ranges of X=0.35 to 0.6 and Y=0.1 to 0.3.

Chemical reagent grade $Li_2CO_3$, $TiO_2$, $Nb_2O_5$, $Al_2O_3$, and $NH_4H_2PO_4$ of the corresponding amounts were subjected to ball milling with zirconia balls in a zirconia container at 400 rpm for two hours by using high energy mechanical milling (HEMM) by a planetary micro mill (Fritsch Pulverisette 7) to obtain a mixed powder.

Next, the mixed powder was pressure-molded into pellets at 150 MPa and subjected to calcination at 600° C. for four hours.

The calcinated pellets were reground and subjected to ball milling again by using the HEMM.

The obtained powder was pressure-molded into pellets at 150 MPa under hydrostatic pressure.

Thereafter, the pellets were sintered at 900° C. for seven hours.

Analysis of Test Results

Figure 8:
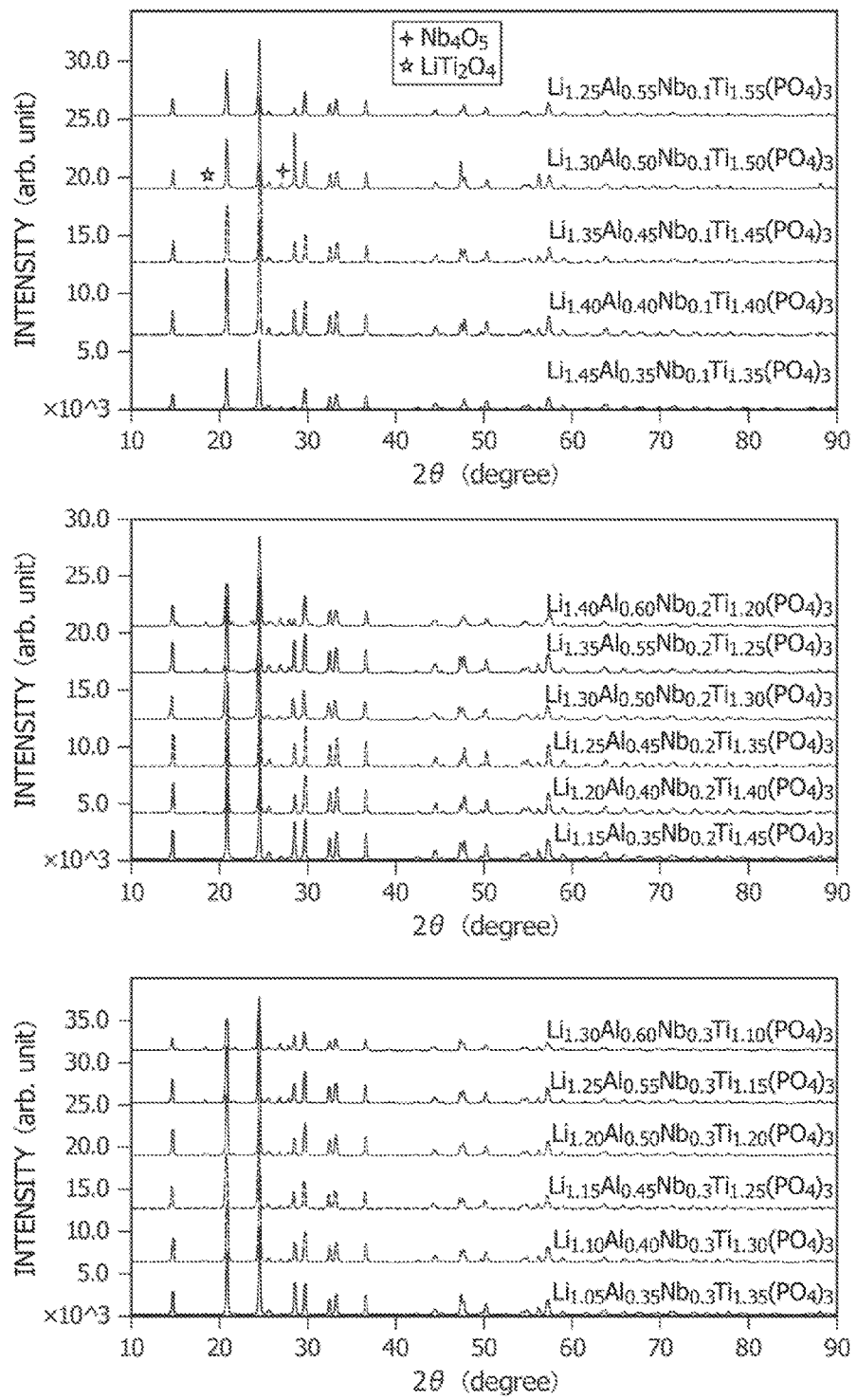
FIG. 8 includes graphs depicting XRD patterns of samples obtained by varying X indicating the atomic ratio of Al in the case in which Y=0.1 to 0.3 in $\text{Li}_{1+X-Y}\text{Al}_X\text{Nb}_Y\text{Ti}_{2-X-Y}(\text{PO}_4)_3$.

FIG. 8 depicts XRD patterns of samples in which Y in $Li_{1+X-Y}Al_XNb_YTi_{2-X-Y}(PO_4)_3$ is set to 0.1, 0.2, and 0.3 and X of Al is set within a range of 0.35 to 0.6.

Table 1 depicts test results of the three-point bending strength, the relative density, and the lithium-ion conductivity in each of the examples in which Y in $Li_{1+X-Y}Al_XN-b_YTi_{2-X-Y}(PO_4)_3$ is set to 0.1, 0.2, and 0.3 and X of Al is set within the range of 0.35 to 0.6 as described above.

Regarding the relative density, the relative density of each of the sintered samples was estimated from a ratio between the density calculated from the lattice constants and the density calculated from the volume and mass of the sintered main body.

Note that, regarding the lithium-ion conductivity, the lithium-ion conductivity of each of sintered pellets (diameter of about 12 mm and thickness of 1 mm) having electrodes sputtered with gold was measured at bias voltage of 10 mV within a frequency range of 0.1 Hz to 1 MHz, by using an impedance phase analyzer (Solartron 1260).

The test results are shown in Table 1.

TABLE 1

| Nb | Al | Impurities | Strength [N/mm²] | Density [%] | Conductivity [$10^{-4}$ S/cm] |
|---|---|---|---|---|---|
| 0.1 | 0.35 |  | 44 | 77.5 | 1.95 |
|  | 0.4 |  | 27 | 82.0 | 2.41 |
|  | 0.45 |  | 35 | 88.25 | 3.15 |

TABLE 1-continued

| Nb | Al | Impurities | Strength [N/mm²] | Density [%] | Conductivity [10⁻⁴ S/cm] |
|---|---|---|---|---|---|
|  | 0.5 | Present | 85 | 87.5 | 3.72 |
|  | 0.55 | Present | 104 | 89.25 | 2.00 |
|  | 0.6 | Present | 67 |  |  |
| 0.2 | 0.35 |  | 26 | 78.1 | 1.20 |
|  | 0.4 |  | 42.5 | 84.2 | 1.90 |
|  | 0.45 |  | 46 | 93.1 | 2.25 |
|  | 0.5 |  | 98.5 | 94.7 | 5.60 |
|  | 0.55 |  | 110 | 96.2 | 5.90 |
|  | 0.6 | Present | 108 | 95.8 | 3.00 |
| 0.3 | 0.35 |  | 26 | 80 | 0.5 |
|  | 0.4 |  | 25.5 | 82.0 | 1.65 |
|  | 0.45 |  | 28.5 | 83 | 2.65 |
|  | 0.5 |  | 46 | 89.8 | 3.80 |
|  | 0.55 |  | 55.5 | 94.5 | 2.65 |
|  | 0.6 |  | 80 | 97 | 1.75 |

In the test results of Table 1, the three-point bending strength, the relative density, and the lithium-ion conductivity are favorable when Al is 0.5≤X≤0.6 in the range of Nb of 0.1≤Y≤0.3. In other words, favorable lithium-ion conductivity can be maintained when the ratio of Al is increased to increase the three-point bending strength.

Figure 9:
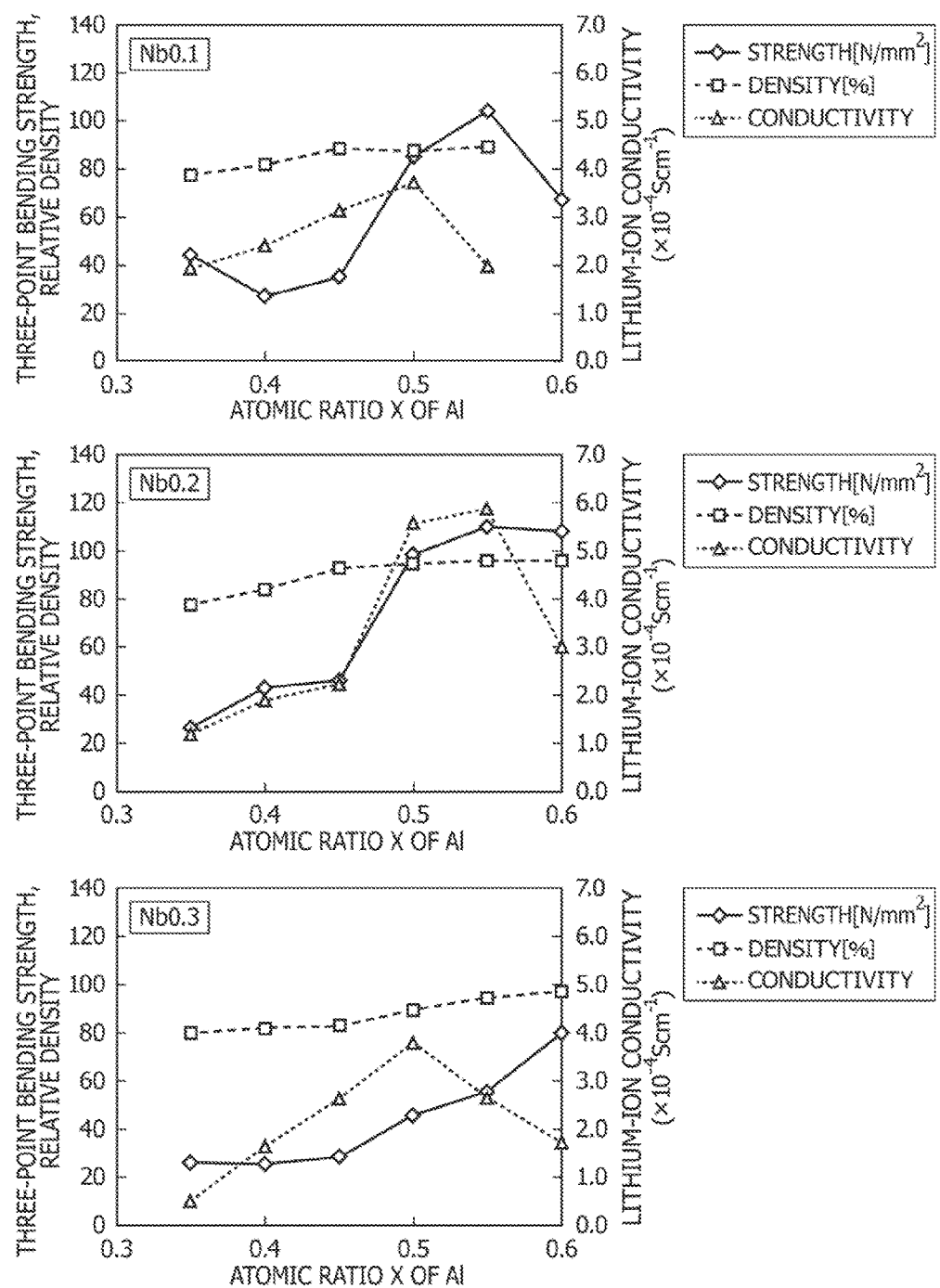
FIG. 9 includes graphs depicting variation of X indicating the atomic ratio of Al and variation of the three-point bending strength, the relative density, and the lithium-ion conductivity in the case in which Y=0.1 to 0.3 in $\text{Li}_{1+X-Y}\text{Al}_X\text{Nb}_Y\text{Ti}_{2-X-Y}(\text{PO}_4)_3$.

FIG. 9 depicts variation in the three-point bending strength, the relative density, and the lithium-ion conductivity in the case in which the ratio Y of Nb is set at a fixed value of 0.2 and the ratio X of Al is varied.

It is understood that, in the range in which the ratio X of Al is 0.5≤X≤0.6, favorable three-point bending strength and lithium-ion conductivity are obtained with the relative density being maintained at a constant level.

INDUSTRIAL APPLICABILITY

The first solid electrolyte of the present invention has high relative density and the probability of water permeating the first solid electrolyte can be reduced. Thus, the first solid electrolyte can be preferably applied to a portion coming into contact with water. Moreover, it is possible to reduce the amount of epoxy resin filling the pores and obtain high lithium-ion conductivity. Accordingly, the first solid electrolyte can be preferably employed as a solid electrolyte for a lithium-air battery.

The second solid electrolyte of the present invention is made to contain Al in an atomic ratio of more than 0.4 and thereby improve the lithium-ion conductivity and also improve the strength. The second solid electrolyte can thus have favorable relative density and be preferably employed in a lithium-air battery and the like.

The invention claimed is:

1. A solid electrolyte satisfying formula (I):

  (I)

(in formula (I), M1 is one or more elements selected from the group consisting of Al, Cu, Co, Fe, Ni, Ga, Cr, and Sc; M2 is one or more elements selected from the group consisting of Si, Ge, Sn, Hf, Zr, and Nb; X and Y are real numbers satisfying X+Y≤1; and the Y satisfies 0.1≤Y≤0.3), wherein
the solid electrolyte has a NASICON-type crystal structure, and
lattice constants of the NASICON-type crystal structure are such that a length along an a-axis is 0.8 nm or more and a length along a c-axis is 2.8 nm or less.

2. The solid electrolyte according to claim 1, wherein the X satisfies 0.35≤X≤0.50.

3. The solid electrolyte according to claim 2, which has a relative density of 92% or more.

4. The solid electrolyte according to claim 2, which has a lithium-ion conductivity of 4.0×10⁻⁴ S/cm or more.

5. The solid electrolyte according to claim 2, which has a three-point bending strength of 40 N/mm² or more.

6. The solid electrolyte according to claim 1, which has a relative density of 92% or more.

7. The solid electrolyte according to claim 1, which has a lithium-ion conductivity of 4.0×10⁻⁴ S/cm or more.

8. The solid electrolyte according to claim 1, which has a three-point bending strength of 40 N/mm² or more.

9. A method of manufacturing a solid electrolyte satisfying formula (I):

  (I)

(in formula (I), M1 is one or more elements selected from the group consisting of Al, Cu, Co, Fe, Ni, Ga, Cr, and Sc, M2 is one or more elements selected from the group consisting of Si, Ge, Sn, Hf, Zr, and Nb, and X and Y are real numbers satisfying X+Y≤1; and the Y satisfies 0.1≤Y≤0.3), the method comprising the steps of:
mixing a solid powder including a composition to form the solid electrolyte;
forming a compact by pressure-molding the mixed powder; and
annealing the compact.

10. The method of manufacturing a solid electrolyte according to claim 9, wherein a sintering temperature in the step of annealing the compact is 900 to 1200° C.

11. A solid electrolyte satisfying formula (II):

  (II)

(in formula (II), X and Y are real numbers satisfying X+Y≤1, and the Y satisfies 0.1≤Y≤0.3), wherein
the solid electrolyte has a NASICON-type crystal structure.

12. The solid electrolyte according to claim 11, wherein the X satisfies 0.5≤X≤0.6.

13. A method of manufacturing a solid electrolyte satisfying formula (II):

  (II)

(in formula (II), X and Y are real numbers satisfying X+Y≤1, and the Y satisfies 0.1≤Y≤0.3), the method comprising the steps of:
mixing a solid powder including a composition to form the solid electrolyte;
forming a compact by pressure-molding the mixed powder; and
annealing the compact.

14. The method of manufacturing a solid electrolyte according to claim 13, wherein a sintering temperature in the step of annealing the compact is 900 to 1000° C.

* * * * *